April 10, 1934.  F. J. VLCHEK  1,954,155
DROP HAMMER
Filed Feb. 5, 1930  6 Sheets-Sheet 1

Fig.1

Frank J. Vlchek
Inventor
by Smith and Freeman
Attorneys

April 10, 1934.　　　　F. J. VLCHEK　　　　1,954,155
DROP HAMMER
Filed Feb. 5, 1930　　　　6 Sheets-Sheet 2

Frank J. Vlchek
Inventor
by Smith and Freeman
Attorneys

April 10, 1934.   F. J. VLCHEK   1,954,155
DROP HAMMER
Filed Feb. 5, 1930   6 Sheets-Sheet 3

Frank J. Vlchek
Inventor
by Smith and Freeman
Attorneys April 10, 1934.  F. J. VLCHEK  1,954,155
DROP HAMMER
Filed Feb. 5, 1930  6 Sheets-Sheet 5

Frank J. Vlchek
Inventor
by Smith and Freeman
Attorneys

Patented Apr. 10, 1934

UNITED STATES PATENT OFFICE 1,954,155

DROP HAMMER

Frank J. Vlchek, Cleveland, Ohio, assignor to The Vlchek Tool Company, Cleveland, Ohio, a corporation of Ohio Application February 5, 1930, Serial No. 426,031

13 Claims. (Cl. 78—29)

My invention relates to drop hammers, and the principal object of my invention is to provide a new and improved drop hammer, and particularly a new and improved means for controlling the raising and releasing of the hammer head. In the drawings accompanying this specification and forming a part of this application I have shown for purposes of illustration one form which my invention may assume, and in these drawings:

Figure 12 is a transverse vertical sectional view corresponding to the line 12—12 of Figure 11, Figures 13 through 18 disclose different embodiments of transmitting mechanism, while

The embodiment of my invention herein shown comprises a base support 11, which may be sunk a suitable distance into the floor 12 to provide a firm anchorage therefor. The base is provided with a recess 13 for the accommodation of a die support 14 detachably fixed in the recess 13 by the use of wedges, as indicated at 15. The die support 14 is provided with a dove-tailed groove 16 which accommodates a correspondingly shaped tongue 17 formed upon the die proper 18, the latter being held in position by set screws, or other suitable means, not shown.

Figures 2, 7, 8, 9, 10:
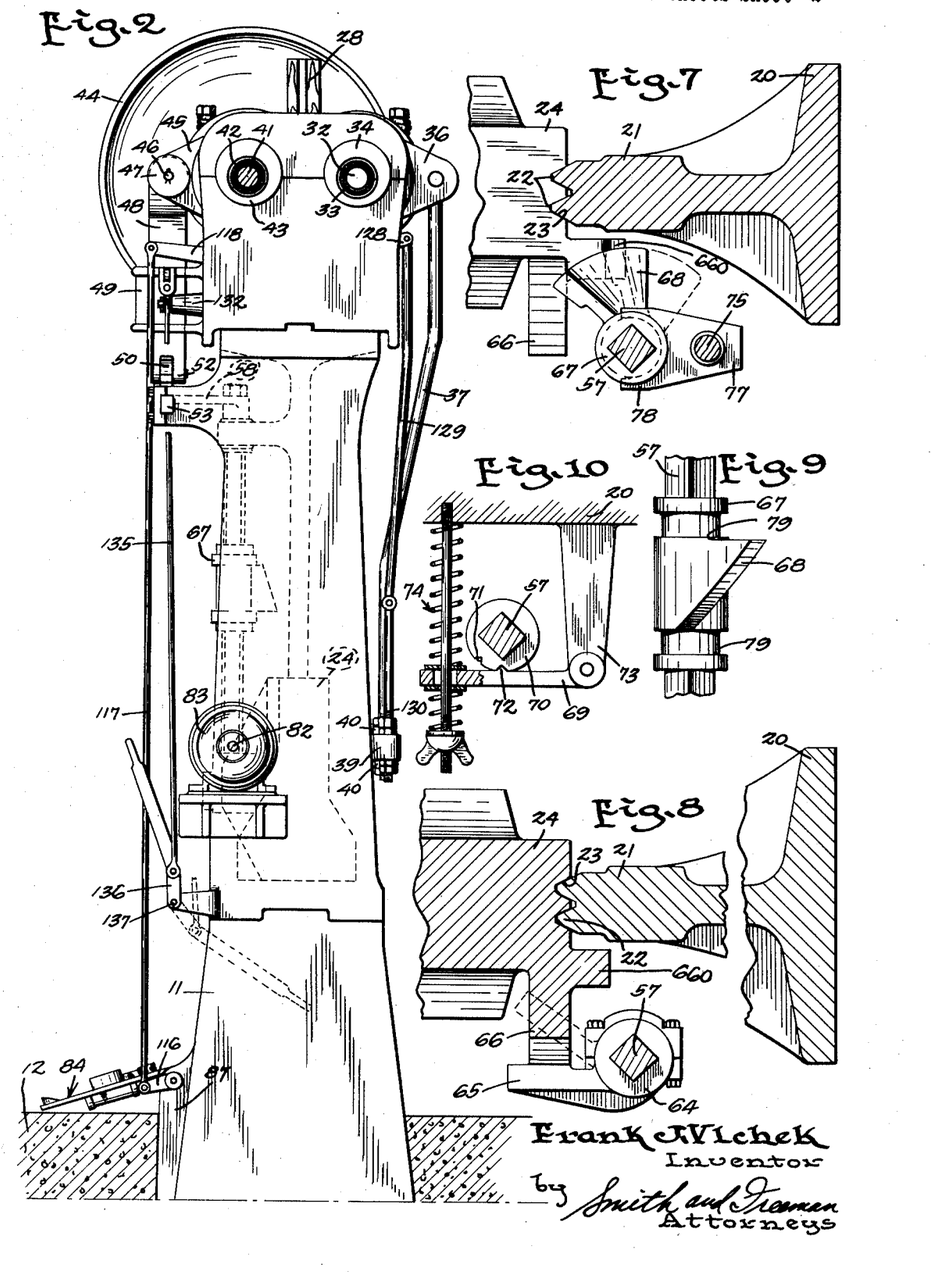
Figure 2 is a side elevational view of said embodiment.
Figure 7 is an enlarged fragmentary horizontal sectional view corresponding to the line 7—7 of Figure 1.
Figure 8 is an enlarged fragmentary horizontal sectional view corresponding to the line 8—8 of Figure 1.
Figure 9 is an enlarged elevational view of the disconnecting cam.
Figure 10 is an enlarged horizontal sectional view corresponding to the line 10—10 of Figure 1.

Secured to the upper surface of the base support 11 and reaching upwardly therefrom to a connecting head 19 are spaced standards 20, each of these standards being substantially T-shaped in cross-section, as best shown in Figures 7 and 8, with the stems 21 disposed inwardly and providing projections 22 receivable in guide grooves 23 formed in a hammer head 24.

At its lower end the hammer head 24 carries a die supporting portion 25 provided with a dove-tailed groove 155 adapted to accommodate a dove-tailed tongue 26 of a die 27 adapted to cooperate with the die 18. At its upper end the hammer head 24 has attached thereto a plurality of boards 28, each square or diamond-shaped in cross-section to provide V-shaped contours along the engaging surfaces thereof, the boards extending upwardly through suitable openings in the head 19, and into engagement with the hammer actuating means.

Figure 3:
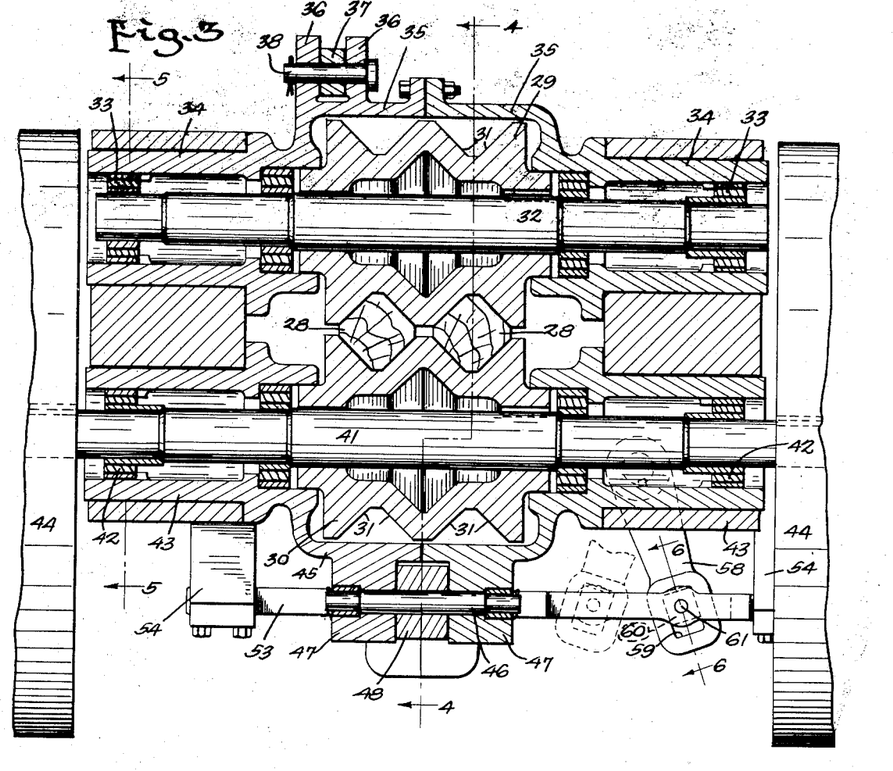
Figure 3 is an enlarged horizontal sectional view corresponding to the line 3—3 of Figure 1.
Figure 4:
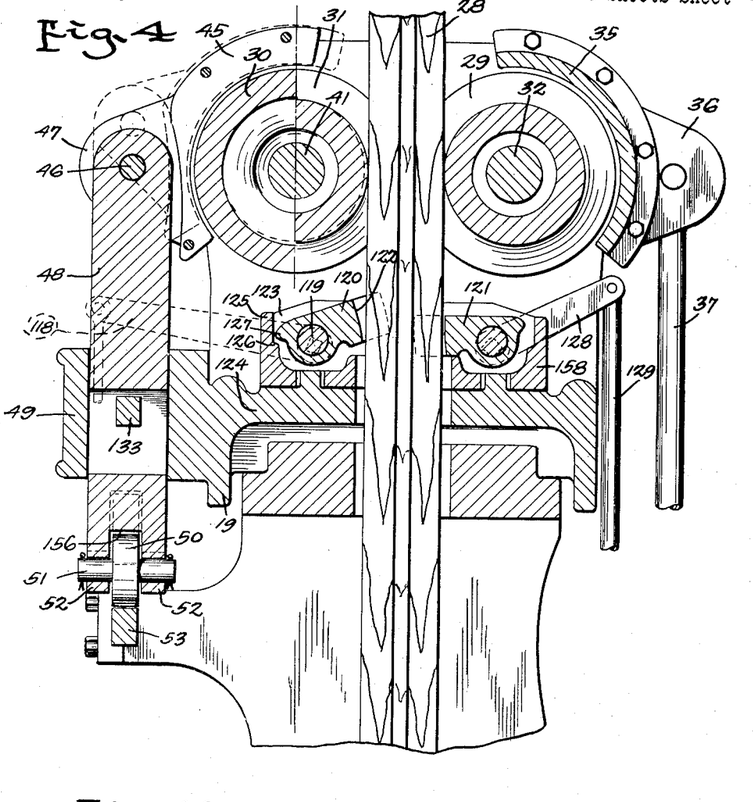
Figure 4 is an enlarged vertical sectional view corresponding to the line 4—4 of Figure 3.
Figure 5:
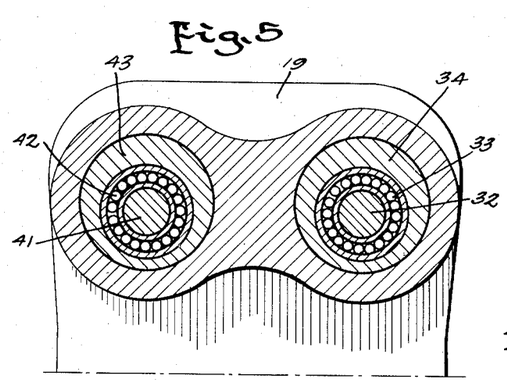
Figure 5 is an enlarged vertical sectional view corresponding to the line 5—5 of Figure 3.
Figure 6:
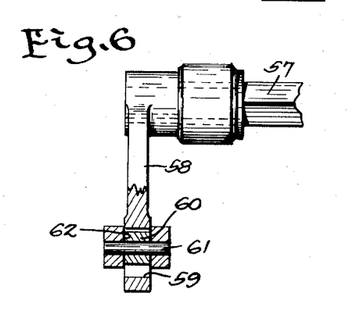
Figure 6 is an enlarged sectional view corresponding to the line 6—6 of Figure 3.

The actuating means comprises a pair of rollers 29 and 30 mounted in the head 19 as best shown in Figure 3. Each roller is provided with a pair of V-shaped grooves 31 which accommodate the cross-sectional contour of the boards 28. The roller 29 is mounted upon a shaft 32, the outer ends of which are supported by means of anti-friction bearings 33 eccentrically carried by bearing supports 34, the latter being rotatably carried by the head 19. The bearing supports 34 are of a split type and have extensions 35 connected together by bolts, so that said bearing supports rotate in unison. Formed on one of the extensions 35 is a pair of ears 36 adapted for the reception of the upper end of an adjusting rod 37 connected in said ears by a pivot pin 38 and having its opposite end extending through a bracket 39 on the adjacent standard 20 and adjustably fixed in position with respect to said bracket by nuts 40. The roller 30 is mounted upon a shaft 41, the ends of which are carried in anti-friction bearings 42, eccentrically disposed with reference to annular bearing supports 43 which are rotatably carried by the head 19. The outer ends of the shaft 41 have secured thereto pulleys 44 which may be connected by suitable belts to a driving motor, not shown. The bearing supports 43 are connected together and formed at their outer sides to provide a crank portion 45 to which is pivotally attached by means of a pin 46, extending through ears 47, an elongated weight 48. As best shown in Figure 4, the weight is slidably mounted in a looped guide 49 forming part of the head 19, and projects beneath the same a suitable distance, the weight 48 being of such character as normally to rotate the bearing supports 43 in such manner as to bias the roller 30 toward engagement with the boards 28. At its lower end the weight 48 is cut out to provide a slot 156 for the accommodation of a roller 50 rotatably mounted upon a pin 51 carried by the divided end portions 52 flanking the slot 156 at the lower end of the weight 48. Cooperating with the roller 50 is an elongated slide bar 53 having its ends slidably supported in bearings 54 carried by the standards 20. Intermediate its ends the slide bar 53 has a widened portion, and this portion is connected with the remainder of the bar by an incline forming a cam 55 upon which the roller 50 rides when the slide bar 53 is moved toward the left as viewed in Figure 1, a stop 56 being provided adjacent the top of the cam 55 over which the roller 50 rides, and which prevents accidental travel of the roller 50 until the bar 53 is positively moved in the reverse direction, at which time the roller 50 rides over the stop 56, and down the inclined surface of the cam 55, thereby permitting the weight 48 to move downwardly and exert force upon the roller 30 in a direction to move the roller 30 toward the boards 28 of the hammer head 24, the action of the cam decelerating the descent of the weight 48 and effecting gradual engagement of the rods with the boards, thereby preserving the boards against deformation and injury.

Motion is transmitted to the slide bar 53 through the medium of an oscillatable rod 57 having at its upper end a horizontally extending crank portion 58 which at its outer end is provided with an aperture 59 for the accommodation of a block 60 carried upon a pin 61 within an aperture 62 formed in the adjacent end of the slide bar 53, oscillation of the crank 58 serving thus to impart reciprocation to the slide bar 53, and hence to govern the position of the roller 30 with respect to the roller 29 and the boards 28 of the hammer head 24.

The oscillatable rod 57 extends substantially parallel to the path of the movement of the hammer head 24, and at one side of said path, is rotatably supported at its ends in brackets 63 carried by the adjacent standard 20, and is non-circular in cross-section intermediate its ends. Adjacent the lower end of the rod 57 is adjustably fixed a cam member 64 having a cam portion 65 adapted to be engaged by a cam 66 formed on the hammer head 24, these cams 64 and 66 being so shaped that the descent of the hammer head 24 causes engagement of the cams 64 and 66 and serves to impart oscillation to the rod 57 in a counter clock-wise direction. This movement of the rod 57 moves the slide 53 toward the right, as shown in Figure 1, so as to permit re-engagement of the rollers 29 and 30 with the boards 28 of the hammer head 24, thus to effect elevation of the hammer head 24.

Figure 1:
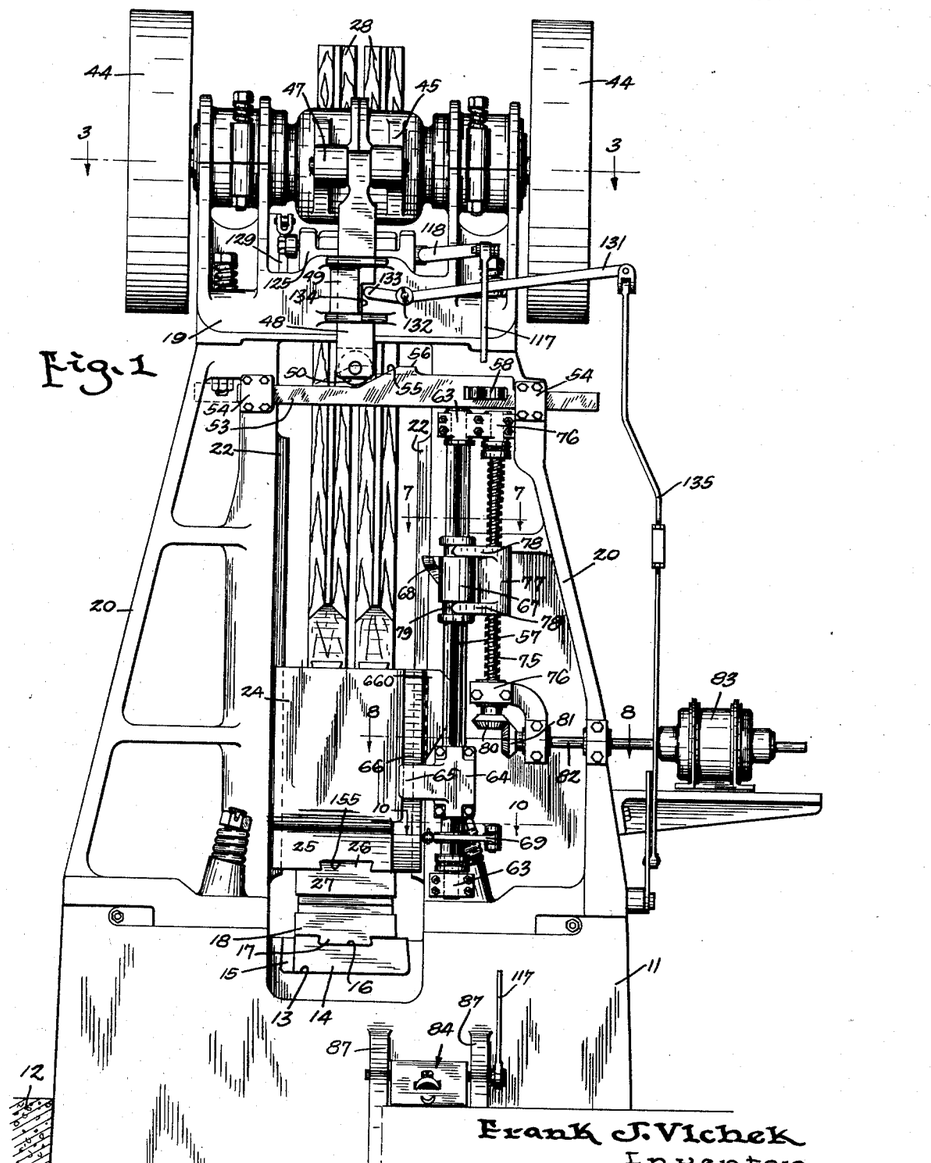
Figure 1 is a front elevational view of the embodiment of my invention herein disclosed.

Slidably and non-rotatably mounted upon the rod 57 is a second cam member 67 having a cam portion 68 arranged in a reverse manner when compared with the cam 65, and adapted to engage a second cam 660 on the hammer head 24 when the hammer head 24 is raised or elevated, the cams 660 and 68 being so shaped that upward movement of the hammer head 24 imparts a clock-wise movement to the rod 57 with a consequent movement of the slide 53 to the left, as viewed in Figure 1, resulting in elevation of the weight 48 and separation of the roller 29 from the roller 30, this permitting the hammer head 24 to drop.

In order to control the rod 57 against accidental movement a latch member 69 is provided for cooperation with a collar 70 mounted at the lower end of the rod 57. The collar 70 is provided in its periphery with a pair of notches 71 adapted for accommodation of a tooth 72 on the latch 69. The latch 69 is pivoted at one end to a post 73 on the adjacent standard 20, and at its opposite end is resiliently pressed toward the collar 70 by a spring device 74. When the rod 57 is oscillated to the limit of its movement in one direction, the tooth 72 will engage one of the notches 71, and when the rod 57 is positively moved to the limit of its movement in the opposite direction, the tooth 72 will engage the other notch 71, thereby preventing accidental movement of the rod 57.

The cam member 67 may be set in various fixed adjusted positions vertically of the rod 57 by manipulation of means convenient to the operator. Means for accomplishing this purpose comprises a screw 75 rotatably mounted at its ends in brackets 76 carried by the adjacent standard 20, and threaded upon the screw 75 is a nut 77 provided with upper and lower forked portions 78 for rotatably engaging upper and lower grooved portions 79 of the cam member 67, whereby rotation of the screw effects vertical travel of the nut 77 and of the cam member 67 with respect to the rod 57, while permitting the required oscillation of the rod, thereby allowing adjustment and variation of the stroke of the hammer head 24 during operation of the machine.

At the lower end of the screw 75 there is provided a bevel gear 80 meshing with a bevel gear 81 carried by a shaft 82 connected with the armature of a reversible motor 83. The motor 83 is controlled by a switch adapted to be actuated by the foot of the operator, a foot pedal 84 being provided for this purpose. The foot pedal 84 comprises a foot piece 85 the inner end of which is pivotally mounted upon a horizontally disposed pivot pin 86 carried by ears 87 formed on the base 11, and mounted on the foot piece 85 is a foot switch member 88 comprising a toe piece 89 pivotally mounted upon a vertically extending stud 90 so as to swing substantially in a horizontal direction. At opposite sides of the toe piece 89 are disposed pairs of inner and outer contacts 91 and 92 connected with an operating circuit hereinafter referred to. The toe piece 89 is normally maintained in central position, and out of engagement with the contacts 91 and 92, by means of oppositely acting springs 93. A heel piece 94 is provided for retaining the foot of the operator in position to operate the toe piece 89.

Figure 19:
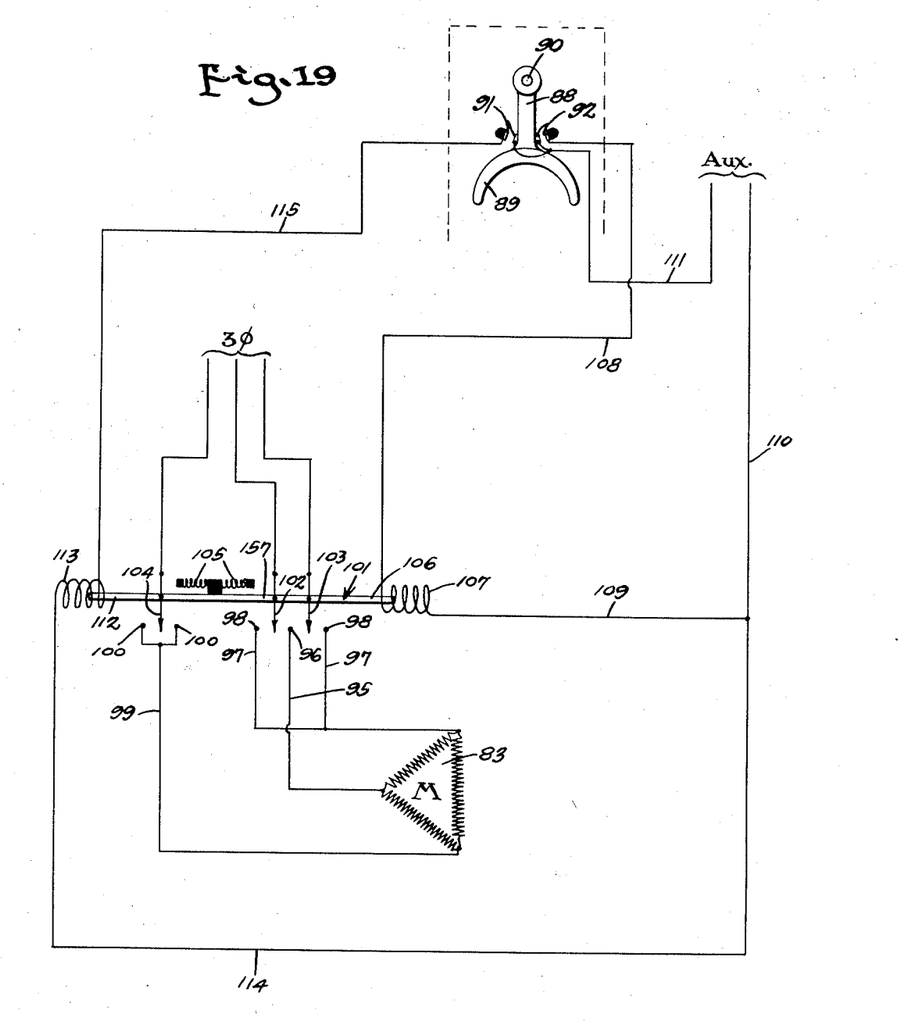
Figure 19 shows a diagrammatic layout of the reversible motor and switch mechanism for controlling the actuating mechanism.

The motor operating circuit and foot switch are best shown in diagrammatic form in Figure 19, in which the motor 83 is shown as of the three phase type, one phase winding being connected by a wire 95 to a contact 96, another phase being connected by two wires 97 to contacts 98, while the third phase is connected through a wire 99 to contacts 100. Cooperating with the contacts 96, 98, and 100 is a make and break device 101 having connected therewith contact arms 102, 103, and 104. The make and break device 101 may comprise a reciprocable metallic bar 157 normally held in a central non-contacting position by opposed springs 105. One end portion 106 of the reciprocable bar 157 forms the armature of a solenoid 107, one side of the solenoid 107 being connected by a wire 108 to one of the contacts 92 disposed beside the toe piece 89, and the other side of the solenoid 107 being connected by a branch 109 with a line wire 110. The opposite end 112 of the reciprocating bar 157 forms the armature of a second solenoid 113 connected by a conductor 114 with the auxiliary line wire 110 and by a conductor 115 with one of the contacts 91. The inner contacts 91 and 92 are connected to a second auxiliary line wire 111. By this construction two phases of the motor may be reversed, depending upon whether the contacts 91 or the contacts 92 are brought into engagement through lateral oscillation of the toe member 88 about its pivot 90.

Connected to the outer end of the pivot pin 86 of the foot pedal 85 is a crank member 116 to the outer end of which is pivotally attached a link 117 which extends upwardly and is pivotally connected with the outer end of a lever 118 fixedly connected to the shaft 119 of one of a pair of oppositely disposed arresting dogs 120 and 121. The dog 120 is eccentrically mounted upon the shaft 119 and has its engaging portion of extended length so as to be normally over-balanced or biased toward engaging position. The overbalanced portion of the dog 120 is provided with a pair of V-shaped grooves 122 of a shape to conform to the contour of the boards 28. The shaft 119 is rotatably supported in the side walls 123 of a housing 158 carried by a partition 124 formed in the head 19, and the rear wall 125 of the housing 158 is provided with a stop 126 adapted to be engaged by the tail 127 of the dog 120 to limit its movement in a counter-clock-wise direction. The dog 121 is of identical construction except for its opposite disposition, and the shaft upon which the dog 121 is mounted has fixed thereto a lever 128 to the outer end of which is connected a link 129, the lower end of which is adjustably fixed to the standard 20 as indicated at 130. When the foot pedal 85 is depressed the link 117 will be drawn downwardly rotating the shaft 119 and withdrawing the dog 120 from engagement with the boards 28 permitting free movement of the boards 28, and of the hammer head 24; when the pedal 85 is released the dog 120 drops to engaged position with the boards 28, and in conjunction with the dog 121 engages the boards 28 to prevent movement thereof, and of the hammer head 24, in a downward direction.

In order to prevent re-engagement of the actuating rollers 29 and 30 under the influence of the weight 48, means are provided for maintaining the weight 48 elevated, and the roller 30 separated from the roller 29 and the boards 28. This means comprises a lever 131 pivotally supported upon the head 19 at 132, the working end 133 of the lever 131 being disposed in a slot 134 provided in the weight 48. To the outer end of the lever 131 is pivotally connected a link 135 having its lower end pivotally connected between the ends of the lever 136, the latter being pivotally connected as at 137 to a bracket 138 formed on the adjacent standard 20. Downward movement of the lever 136 pulls the link 135 downwardly, and hence elevates the working end 133 of the lever 131 to raise the weight 48, and continued movement of the lever 136 past center serves to lock the parts in the manner of a toggle. When the lever 136 is reversed in its movement, that is, moved in a clock-wise direction as viewed in Figure 2, the working end 133 of the lever 131 is lowered, and the weight 48 is permitted to partake of its normal movements, the working end of the lever 133 then sliding in the slot 134.

In operation, assuming that the pulleys 44 are driving the roller 30, the lever 136 is in its locked position to maintain the actuating roller 30 retracted from engagement with the boards 28, and the hammer head 24 is in its lowermost position: in order to start the machine the lever 136 is swung in a clockwise direction as viewed in Figure 2, releasing the weight 48 and permitting the same to bring the roller 30 into engagement with the boards 28; simultaneously, or immediately after releasing the lever 136, the pedal 85 is depressed so that downward movement of the boards 28 may be permitted. The rollers 29 and 30 being in engagement with the boards 28 the hammer head 24 will be lifted, and the cam 660 on the hammer head 24 will come into engagement with the cam 68 on the oscillatable rod 57, and will rock the rod 57, and this movement of the rod 57 will be transmitted through the crank 58 to the slide 53, causing the slide 53 to travel toward the left as viewed in Figure 1, lifting the weight 48, retracting the roller 30, and permitting the hammer head 24 to drop. During the downward movement the cam 66 of the hammer head 24 will come into contact with the lower cam 65 on the rod 57, imparting movement to the rod 57 in a direction the reverse of that imparted to the rod 57 during upward movement of the hammer head 24. This reverse movement will be transmitted to the slide 53, moving the slide 53 toward the right as viewed in Figure 1, permitting the weight 48 to drop and re-engage the roller 30, whereby the hammer head 24 is again lifted. Accidental movement of the rod 57 is prevented by the latch member 69.

Figure 11:
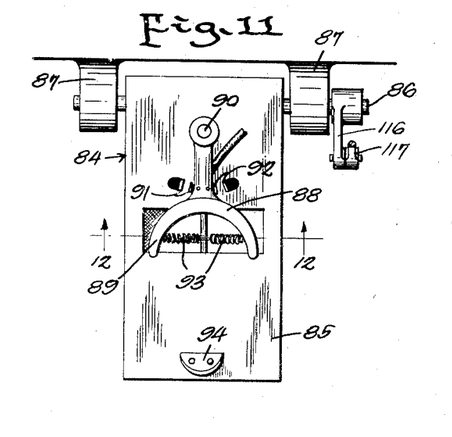
Figure 11 is an enlarged top plan view of the foot pedal construction.
Figure 12:
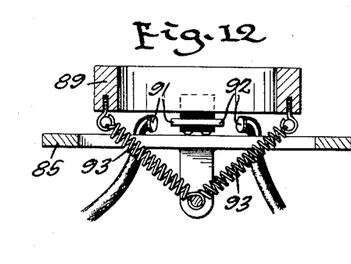

The length of the stroke of the hammer head 24 may be varied at will, from a very short stroke to the full stroke, through adjustment of the cam 68 with respect to the rod 57, brought about through manipulation of the toe piece 89. When the toe piece 89 is swung to the left, as viewed in Figure 11, the contacts 91 are closed; closing of these contacts energizes the solenoid 113 moving the make and break device 101 to the left, as viewed in Figure 19, and establishing a circuit in the motor 83 to cause rotation of its armature shaft 82 and, through the gears 80 and 81, rotation of the screw 75. This movement is transmitted through the nut 77 to the cam member 67, and consequently to the cam 68, and the cam 68 is raised, and the stroke is lengthened. When adjustment of the cam member 67 is desired in the opposite direction the toe piece 89 is swung in the opposite direction to close the contacts 92, energizing the solenoid 107, reversing two phases of the motor 83, and hence reversing the direction of movement of the armature shaft 82, of the screw 75, and of the cam 68, thus lowering the cam 68, and shortening the stroke.

When it is desired to stop operation of the machine with the hammer head 24 in elevated position, the foot pedal 85 is released, permitting the dog 120 to move to engaged position with the boards 28, thereby clamping the boards 28 between the dog 120 and the dog 121, and preventing downward movement of the boards 28, and therefore the hammer head 24. If it is desired to stop the machine with the hammer head 24 in lowered position, the dogs 120 and 121 are left disengaged to permit the hammer head 24 to fall, and the lever 136 is swung in a counter clock-wise direction, as viewed in Figure 2, to lift the weight 28 and thus disengage the roller 30 from engagement with the boards 28, the toggle connection of the lever 136 with the link 135 serving to maintain the weight 48 elevated until again released.

Figure 13:
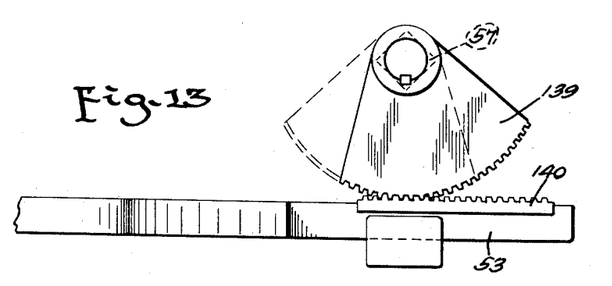
Figure 14:
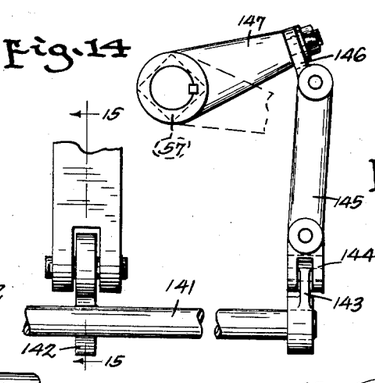

Figure 13 shows a different embodiment of transmitting means from the oscillating rod 57 to the slide 53, in which the oscillatable rod 57 is provided, not with the crank 58, but with a segmental pinion 139 meshing with a rack 140 carried by the slide 53, the rod 57 and the slide 53 being otherwise of the type heretofore referred to.

Figure 15:
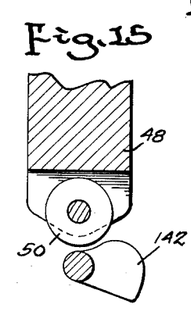
Figure 16:
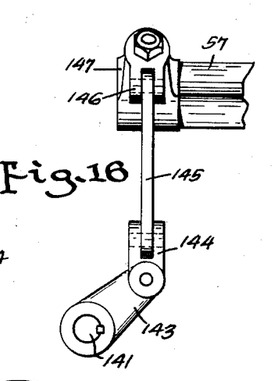
Figure 17:
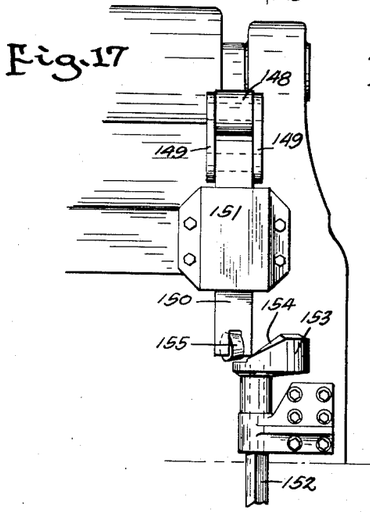

In Figures 15 to 17 another embodiment of the transmitting means is disclosed, and in this construction the slide 53 is omitted, and instead there is provided an oscillatable shaft 141 carrying a cam 142 adapted to ride beneath the roller 50 of the weight 48, the shaft 141 being carried in suitable bearings on the head 19. At one end the shaft 141 is provided with a crank member 143 connected by a universal joint 144 with a link 145 connected through a second universal joint 146 with a crank 147 fixed to the oscillatable rod 57. Oscillation of the rod 57 thereby transmits to the cam 142 corresponding oscillation, which serves to lift, and to permit lowering of, the weight 48.

Figure 18:
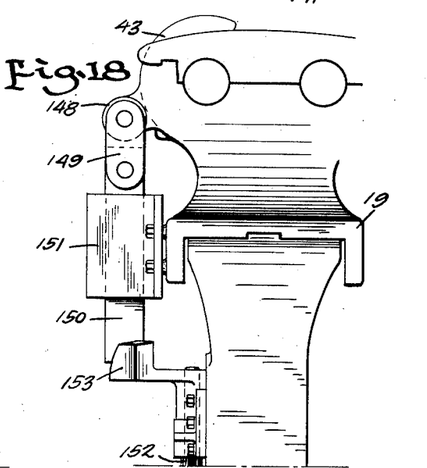

Figures 17 and 18 show still another embodiment of the transmitting means between the oscillatable rod 57 and the actuating rollers 29 and 30. In this construction the bearing supports 43 are provided with an extension or crank member 148 adjacent one end thereof, and connected to the crank member 148 by links 149 is a weight 150 slidably supported in a guide bracket 151 carried by the head 19, the weight 150 being slidable in a plane substantially vertically in line with the oscillatable rod 152 corresponding to the rod 57. The oscillatable rod 152 at its upper end is provided with a cam member 153 having a cam surface 154 adapted to ride beneath the roller 155 carried by the lower end of the weight 150, whereby oscillation of the rod 152 through the cam member 153 brings about vertical reciprocation of the weight 150, to effect oscillation of the bearing supports to alternately move the actuating roller 30 to engaged and disengaged position with respect to the boards 28.

From the foregoing description it will be obvious to those skilled in the art that I have produced a new and improved drop hammer and particularly a new and improved control means therefor, that the embodiment of the invention herein shown includes advantages other than those particularly pointed out or suggested herein, and that this particular embodiment of my invention may be variously changed and modified without departing from the spirit of my invention or sacrificing the advantages thereof; accordingly it will be understood that the disclosure herein is illustrative only, and that my invention is not limited thereto.

I claim:

1. A drop hammer machine, comprising: a hammer unit, including a hammer; actuating means for elevating said hammer; a trip means operatively related to said actuating means and adjustable along the path of said hammer, adapted to be engaged by said hammer unit to operate said actuating means to permit said hammer to drop; power means comprising a screw rotatably mounted and held against longitudinal movement and operatively connected with said trip means for moving said trip means along such path and for holding said trip means in adjusted position therealong; and means under the control of the operator for actuating said power means.

2. A drop hammer machine, comprising: a hammer unit, including a hammer; actuating means for elevating said hammer; a trip means operatively related to said actuating means and adjustable along the path of said hammer, adapted to be engaged by said hammer unit to operate said actuating means to permit said hammer to drop; power means operatively connected with said trip means for moving said trip means along such path and for holding said trip means in adjusted position therealong; an electric motor operatively connected with said power means for imparting operative movements thereto; and switch means controllable by manipulation of the foot of the operator for controlling the movements of said motor.

3. A drop hammer machine, comprising: a hammer unit, including a hammer; actuating means for elevating said hammer; a trip means operatively related to said actuating means and adjustable along the path of said hammer, adapted to be engaged by said hammer unit to operate said actuating means to permit said hammer to drop; power means comprising a screw rotatably mounted and held against longitudinal movement and operatively connected with said trip means for moving said trip means along such path and for holding said trip means in adjusted position therealong; a motor operatively connected with said screw for imparting rotative movements to said screw; and means under the control of the operator for controlling operation of said motor.

4. A drop hammer machine, comprising: a hammer unit, including a hammer; actuating means for elevating said hammer; a trip means operatively related to said actuating means and adjustable along the path of said hammer, adapted to be engaged by said hammer unit to operate said actuating means to permit said hammer to drop; power means comprising a screw rotatably mounted and held against longitudinal movement and operatively connected with said trip means for moving said trip means along such path and for holding said trip means in adjusted position therealong; a reversible motor operatively connected with said screw for imparting rotative movements to said screw in opposite directions; and switch means for controlling said motor, selectively operable to effect movement of said motor and of said screw in one direction or the other, at the will of the operator.

5. A drop hammer machine, comprising: a hammer unit, including a hammer; actuating means for elevating said hammer; a trip means operatively related to said actuating means and adjustable along the path of said hammer, adapted to be engaged by said hammer unit to operate said actuating means to permit said hammer to drop; power means comprising a screw rotatably mounted and held against longitudinal movement and operatively connected with said trip means for moving said trip means along such path and for holding said trip means in adjusted position therealong; and foot-controllable means for effecting rotative movements of said screw.

6. A drop hammer machine, comprising: a hammer unit, including a hammer; actuating means for elevating said hammer; a trip means operatively related to said actuating means and adjustable along the path of said hammer, adapted to be engaged by said hammer unit to operate said actuating means to permit said hammer to drop; power means comprising a screw rotatably mounted and held against longitudinal movement and operatively connected with said trip means for moving said trip means along such path and for holding said trip means in adjusted position therealong; a reversible motor operatively connected with said screw for imparting rotative movements to said screw in opposite directions; and foot-controlled switch means for controlling said motor, selectively operable through manipulation of the foot of the operator to effect movement of said motor and of said screw in one direction or the other.

7. A drop hammer machine, comprising: a hammer unit, including a hammer; actuating means for elevating said hammer; a trip means operatively related to said actuating means and mounted for free travel along the path of said hammer either when the hammer machine is continuously operating or when the hammer machine is at rest, adapted to be engaged by said hammer unit at any point in its travel to operate said actuating means to permit said hammer to drop; power means comprising a screw rotatably mounted and held against longitudinal movement and operatively connected with said trip means for moving said trip means along such path and for holding said trip means in adjusted position therealong either when the hammer machine is continuously operating or when the hammer machine is at rest; and means under the control of the operator for actuating said power means.

8. A drop hammer machine, comprising: a hammer unit, including a hammer; actuating means for elevating said hammer; a trip means operatively related to said actuating means and mounted for free travel along the path of said hammer either when said hammer machine is continuously operating or when the hammer machine is at rest, adapted to be engaged by said hammer unit to operate said actuating means to permit said hammer to drop; power means comprising a screw rotatably mounted and held against longitudinal movement and operatively connected with said trip means for moving said trip means along such path and for holding said trip means in adjusted position therealong; a reversible motor operatively connected with said screw for imparting rotative movements to said screw in opposite directions; and means under the control of the operator for controlling the operative movements of said motor.

9. A drop hammer machine having a hammer unit including a hammer and a tailpiece; rolls, at least one of which is eccentrically mounted, whereby said rolls are engageable and disengageable with respect to said tailpiece to elevate and drop said hammer; a weighted member connected to the eccentric mounting of the eccentrically mounted roll and operable upon descent through influence of gravity to urge said roll toward engagement with said other roll and said tailpiece; cam means moving across the path of descent of said weighted member; and means for positively moving said cam, and said cam presenting a contour operable to retard the descent of said weighted member and effect gradual engagement of said rolls.

10. A drop hammer machine, comprising: a hammer unit, including a hammer; actuating means for elevating said hammer; an oscillatable rod disposed along the path of said hammer; means for transmitting oscillatory movement of said rod to said actuating means to actuate the latter to permit said hammer to drop; a trip means mounted on and adjustable axially along said oscillatable rod, and movable laterally of such path, and adapted to be so moved by said hammer unit, to oscillate said oscillatable rod and operate said actuating means to permit said hammer to drop; power means comprising a screw rotatably mounted and held against longitudinal movement and operatively connected with said trip means for moving said trip means along said oscillatable rod and for holding said trip means in adjusted position therealong; and means under the control of the operator for actuating said power means.

11. A drop hammer machine, comprising: a hammer unit, including a hammer; actuating means for elevating said hammer; a trip means operatively connected to said actuating means and adjustable along the path of said hammer, adapted to be engaged by said hammer unit to operate said actuating means to permit said hammer to drop; arresting means for holding said hammer in an elevated position; motor driven mechanism operatively connected with said trip means for moving said trip means along such path and for holding said trip means in adjusted position therealong; control means for controlling said arresting means; and means under the control of one limb of the operator for simultaneously controlling said mechanism and said control means.

12. A drop hammer machine, comprising: a hammer unit, including a hammer and a tailpiece; rolls, at least one of which is eccentrically mounted whereby said rolls are engageable and disengageable with respect to said tailpiece to elevate and drop said hammer; a weighted member connected to the eccentric mounting of the eccentrically mounted roll and operable through influence of gravity to urge said roll toward engagement with said other roll and with said tailpiece; an oscillatable rod disposed along the path of said hammer; means for transmitting oscillatory movement of said rod to said actuating means to actuate the latter to permit said hammer to drop, said transmitting means comprising cam means moving across the path of descent of said weighted member, said cam presenting a contour operable, to retard the descent of said weighted member and effect gradual engagement of said rolls; a trip means mounted on and adjustable axially along said oscillatable rod, and movable laterally of such path, and adapted to be so moved by said hammer unit, to oscillate said oscillatable rod and operate said actuating means to permit said hammer to drop; power means operatively connected with said trip means for moving said trip means along said oscillatable rod and for holding said trip means in adjusted position therealong; and means under the control of the operator for actuating said power means.

13. A drop hammer machine, comprising: a hammer unit, including a hammer and a tailpiece; rolls, at least one of which is eccentrically mounted whereby said rolls are engageable and disengageable with respect to said tailpiece to elevate and drop said hammer; a weighted member connected to the eccentric mounting of the eccentrically mounted roll and operable through influence of gravity to urge said roll toward engagement with said other roll and with said tailpiece; an oscillatable rod disposed along the path of said hammer; means for transmitting oscillatory movement of said rod to said actuating means to actuate the latter to permit said hammer to drop, said transmitting means comprising cam means moving across the path of descent of said weighted member, said cam means presenting a contour operable to retard the descent of said weighted member and effect gradual engagement of said rolls; and trip means mounted on said oscillatable rod, and movable laterally of such path, and adapted to be so moved by said hammer unit, to oscillate said oscillatable rod and operate said actuating means to permit said hammer to drop.

FRANK J. VLCHEK.